US010509839B2

(12) United States Patent
Davidsson et al.

(10) Patent No.: US 10,509,839 B2
(45) Date of Patent: Dec. 17, 2019

(54) METHOD AND SYSTEM FOR PROVIDING PERSONALIZED POSITION-BASED INFOTAINMENT

(71) Applicant: VOLVO CAR CORPORATION, Gothenburg (SE)

(72) Inventors: Staffan Davidsson, Vastra Frolunda (SE); Magnus Ronnang, Vastra Frolunda (SE)

(73) Assignee: Volvo Car Corporation, Gothenburg (SE)

( * ) Notice: Subject to any disclaimer, the term of this patent is extended or adjusted under 35 U.S.C. 154(b) by 144 days.

(21) Appl. No.: 14/859,964

(22) Filed: Sep. 21, 2015

(65) Prior Publication Data

US 2016/0098412 A1     Apr. 7, 2016

(30) Foreign Application Priority Data

Oct. 3, 2014 (EP) .................................... 14187623

(51) Int. Cl.
*G06F 17/30* (2006.01)
*G06F 16/9537* (2019.01)
(Continued)

(52) U.S. Cl.
CPC ..... *G06F 16/9537* (2019.01); *G01C 21/3407* (2013.01); *G01C 21/3697* (2013.01);
(Continued)

(58) Field of Classification Search
CPC ............ G01C 21/3407; G01C 21/3697; G06F 17/30023; G06F 17/3005; G06F 17/3087;
(Continued)

(56) References Cited

U.S. PATENT DOCUMENTS 5,912,644 A * 6/1999 Wang ........................ G01S 5/14
   342/457
6,553,310 B1 * 4/2003 Lopke ................. G06F 17/3087
   701/454

(Continued)

FOREIGN PATENT DOCUMENTS

DE     10030819 A1    1/2002
EP      1378912 A2    1/2004

(Continued)

OTHER PUBLICATIONS

Extended European Search Report for European Application No. 14187623.5, Completed by the European Patent Office, dated Apr. 13, 2015, 6 Pages.

(Continued)

*Primary Examiner* — Shiow-Jy Fan
(74) *Attorney, Agent, or Firm* — Brooks Kushman P.C.

(57) ABSTRACT

A method performed by an infotainment providing system for providing personalized position-based infotainment in a vehicle is disclosed. The infotainment providing system determines at least a first infotainment category of interest. The infotainment providing system further determines a current position of the vehicle. The infotainment providing system searches at least a first online information source, based on the at least first infotainment category of interest and taking into consideration the determined vehicle position. Then, the infotainment providing system retrieves at least a first piece of media content which falls under the at least first infotainment category of interest and which is associated with the determined vehicle position. The infotainment providing system provides the at least first piece of media content while the vehicle is in the vicinity of the determined vehicle position.

19 Claims, 6 Drawing Sheets

(51) Int. Cl.
*G06F 16/43* (2019.01)
*G06F 16/438* (2019.01)
*G11B 27/11* (2006.01)
*G01C 21/34* (2006.01)
*G01C 21/36* (2006.01)

(52) U.S. Cl.
CPC ............ *G06F 16/43* (2019.01); *G06F 16/438* (2019.01); *G11B 27/11* (2013.01)

(58) Field of Classification Search
CPC .... G06F 16/438; G06F 16/9537; G06F 16/43; G11B 27/11
USPC ......... 707/E17.014, 771, E17.009, 738, 740, 707/770
See application file for complete search history.

(56) References Cited

U.S. PATENT DOCUMENTS

| | | | |
|---|---|---|---|
| 8,909,476 B2 | 12/2014 | Tuukkanen | |
| 2002/0041692 A1 | 4/2002 | Seto et al. | |
| 2004/0003706 A1* | 1/2004 | Tagawa | G01C 21/26 84/609 |
| 2005/0246091 A1 | 11/2005 | Kuroda et al. | |
| 2007/0112504 A1 | 5/2007 | Krause et al. | |
| 2008/0015771 A1* | 1/2008 | Breed | B60N 2/2863 701/300 |
| 2008/0262725 A1* | 10/2008 | Whitaker | G01C 21/26 701/431 |
| 2011/0040707 A1 | 2/2011 | Theisen et al. | |
| 2011/0098916 A1* | 4/2011 | Jang | G01C 21/3697 701/533 |
| 2012/0123629 A1* | 5/2012 | Edwards | G01C 21/3407 701/29.1 |
| 2012/0130631 A1 | 5/2012 | Chen | |
| 2012/0150853 A1* | 6/2012 | Tang | G06F 17/30528 707/728 |
| 2012/0265785 A1 | 10/2012 | Paik | |
| 2013/0253833 A1* | 9/2013 | Tuukkanen | G01C 21/26 701/538 |
| 2014/0074395 A1* | 3/2014 | Brown | G01C 21/3682 701/424 |
| 2014/0201770 A1 | 7/2014 | Schrage | |
| 2014/0236462 A1* | 8/2014 | Healey | G08G 1/0962 701/117 |
| 2016/0203716 A1 | 7/2016 | Jeschke | |
| 2016/0298976 A1 | 10/2016 | Sato et al. | |
| 2017/0010125 A1 | 1/2017 | Adachi et al. | |
| 2017/0017851 A1 | 1/2017 | Matsui et al. | |
| 2017/0369056 A1 | 12/2017 | Arai et al. | |

FOREIGN PATENT DOCUMENTS

| | | | |
|---|---|---|---|
| EP | 1378912 A3 | 1/2004 | |
| EP | 1378912 A3 | 10/2005 | |

OTHER PUBLICATIONS

Wu et al. IEEE Transactions of Intelligent Transportation Systems, Sep. 1, 2008, vol. 9, No. 3, pp. 463-475, XP 011347130, "Development of an Adaptive Workload Management System Using the Queueing Network-Model Human Processor (QN-MHP)".

European Patent Office, Office Action for European Application No. 14187623.5-1216, dated May 17, 2019, 9 pages.

Anonymous: Standortbezogene Dienste—Wikipedia, Aug. 8, 2014, XP055587629, Retrieved from the Internet: <<https://de.wikipedia.org/w/index.php?title=Standortbezogene_Dienste&oldid=132896877>>, May 10, 2019.

\* cited by examiner

METHOD AND SYSTEM FOR PROVIDING PERSONALIZED POSITION-BASED INFOTAINMENT

CROSS-REFERENCE TO RELATED APPLICATIONS

This application claims foreign priority benefits under 35 U.S.C. § 119(a)-(d) to European patent application number EP 14187623.5, filed Oct. 3, 2014, which is incorporated by reference herein.

TECHNICAL FIELD

The present disclosure relates to an infotainment providing system and a method performed therein for providing personalized position-based infotainment in a vehicle.

BACKGROUND

While driving, a vehicle driver commonly prefers, perhaps along with fellow vehicle occupants, to simultaneously be entertained, for instance by listening to the radio. The reasons for that may, for instance, relate to taking the opportunity to keep up to date with news updates and/or listening to music, and/or being kept informed of the traffic situation. As a side effect, listening to the radio may be mind-stimulating to the vehicle driver, thus assisting said driver in maintaining his or her attention to thereby drive more safely, and furthermore to enable said driver to, to greater extent, have a pleasant driving experience.

Not uncommonly, however, the e.g. vehicle driver sooner or later find the content of the current radio channel dissatisfying. That is, said driver may lose interest in the e.g. broadcasted radio program, consider the content irrelevant, or even dislike the content thereof, for instance the played music. The vehicle driver may accordingly end up switching desperately between different radio channels, or even turn off the radio in frustration. Neither of the foregoing actions contributes in a positive manner to a great driving experience, nor does either action contribute to driving more safely.

One approach which potentially may improve the driving experience and/or may be mind-stimulating to the driver, may be to provide entertainment which is associated with the region through which the vehicle is planned to travel. Commonly known application "Roadtrip Mixtape", for instance, enables a user, for instance the potential vehicle driver, to create a road trip playlist prior to a planned journey. By indicting start and end positions of said journey in a digital map such as commonly known "Google maps", prior to the journey, a playlist may be created, which comprises music by artists that originate from regions of the planned route.

However, although the generated playlist—when subsequently played in the vehicle during the planned vehicle journey—enables one or more vehicle occupants to potentially, to a greater extent, enjoy the ride, and/or the vehicle driver to, to a greater extent, stay alert, the approach described above is rather static and impersonal. Not only does the playlist need to be created in advance; additionally, the playlist merely comprises music by artists from regions of an assumed, rather than known, vehicle route.

SUMMARY

It is therefore an object of embodiments herein to provide personalized position-based infotainment in a vehicle.

According to a first embodiment herein, the object is achieved by a method performed by an infotainment providing system for providing personalized position-based infotainment in a vehicle. The infotainment providing system determines at least a first infotainment category of interest. The infotainment providing system further determines a current position of the vehicle. Moreover, the infotainment providing system searches at least a first online information source, such as a first predetermined online information source, based on the at least first infotainment category of interest and taking into consideration the determined vehicle position. Then, the infotainment providing system retrieves at least a first piece of media content which falls under the at least first infotainment category of interest and which is associated with the determined vehicle position. The infotainment providing system provides the at least first piece of media content while the vehicle is in the vicinity of the determined vehicle position.

Thereby, there is introduced an approach according to which infotainment media content may be provided in a vehicle in a dynamic rather than static manner. That is, as the infotainment providing system operates essentially in real-time, there is no need to generate a playlist ahead of the journey. Furthermore, as a determined position of the vehicle is taken into consideration, the infotainment media content may be related to an actual route of the vehicle, rather than an assumed, perhaps deceptive, route. Moreover, as preferences of a user, for instance a vehicle driver, additionally are taken into consideration, the infotainment media content may be adapted to suit the e.g. driver, hence enabling him or her to, to greater extent, have a pleasant driving experience.

An advantage with embodiments herein is that an approach is provided which enables the location of the vehicle, along with preferences of a user, to affect the content of infotainment being provided in the vehicle.

Another advantage with embodiment herein is that, since the infotainment providing system determines at least a first infotainment category of interest, preferences of a user as to which infotainment topics are of his or her liking, may be established.

Yet another advantage with embodiments herein is that, since the infotainment providing system searches at least a first online information source, based on the at least first infotainment category of interest and taking into consideration a determined vehicle position, a search of content in one or more trusted online information sources is performed, taking into account category preferences established in the infotainment providing system, as well as an established position of the vehicle.

Still another advantage with embodiments herein is that, since the infotainment providing system retrieves at least a first piece of media content which falls under the at least first infotainment category of interest and which is associated with the determined vehicle position, one or more pieces of media content associated with the one or more categories of interest, as well as associated with the determined vehicle position, is retrieved from the one or more online information sources. Thereby, media content pertinent the at least first infotainment category as well as the determined vehicle position may be filtered out, and subsequently retrieved, from content of the at least first online information source. Consequently, the retrieved media content is considered "personalized" in that preferred categories of e.g. a user, such as the vehicle occupant, are input to the search; correspondingly, the retrieved media content is furthermore considered "position-based" in that the determined current position of the vehicle, and/or a region overlapping and/or being close to the determined current position of the vehicle, as well, is input to the search.

A further advantage with embodiments herein is that, since the infotainment providing system provides the at least first piece of media content while the vehicle is in the vicinity of the determined vehicle position, said media content is only available until the vehicle is considered to no longer be in the vicinity of said determined position. That is, the first piece of media content is only considered to constitute position-based infotainment as long as an updated position of the vehicle is considered to be in vicinity of the previous determined vehicle position. In that manner, the at least first piece of media content may—upon it being determined that an updated position of the vehicle is no longer in said vicinity—be discarded, for instance deleted from the infotainment providing system and/or blocked. Thereby, it is ensured that only local-based infotainment is provided.

For that reason, an approach is introduced which provides personalized position-based infotainment in a vehicle.

The technical features and corresponding advantages of the above mentioned method will be discussed in further detail in the following.

By introducing a method performed by an infotainment providing system for providing personalized position-based infotainment in a vehicle, an approach is provided which enables the location of the vehicle, along with preferences of a user, to affect the content of infotainment being provided in the vehicle. The word "vehicle" may refer to any arbitrary vehicle, and may for instance refer to an engine-propelled vehicle, such as car, truck, lorry, van, bus, motor cycle, scooter, tractor, military vehicle, vessel, boat etc., a rail-bound vehicle, such as e.g. a train or tram, or a bicycle. Moreover, the word "personalized" may refer to "user-preferred", whereas the word "position-based" may refer to "location-based", "taking into consideration the position of the vehicle", "taking into consideration the current or pre-vailing position of the vehicle", and/or "taking into consideration the essentially current position of the vehicle". Furthermore, the word "user" may refer to any arbitrary person utilizing the infotainment providing system, e.g. a vehicle occupant, such as a driver of the vehicle, whereas the word "infotainment" may refer to, for instance, information-based and/or entertainment-based media content.

The infotainment providing system may, for instance, at least partly be comprised in the vehicle, such as in an in-vehicle system thereof. An "in-vehicle system", which may also be referred to as a "built-in vehicle system", "native in-vehicle control system" or "vehicle infotainment system", may refer to hardware/software products and systems which are permanently or temporarily built into, or can be added to the vehicle, in order to enhance the vehicle occupant experience when it comes to providing audio and visual entertainment, as well as automotive navigation systems. Accordingly, the in-vehicle system may comprise resources adapted for functionality control of the in-vehicle system, such as microphones, speakers, input/control devices such as physical push buttons, rocker buttons, dials, slider switches, sticks, and/or a touchpad. The in-vehicle system may further comprise one or several displays, such as touch sensitive displays, commonly utilized to display e.g. graphic, video, digital images, animations and text, and further utilized to display e.g. virtual buttons, menus, and other user-interface objects to thereby provide a user interface through which a vehicle occupant, for instance the driver, may interact with the in-vehicle system. Accordingly, the resources of the in-vehicle system, such as the microphone(s), loudspeaker(s), input/control devices and/or display(s), may be utilized to provide functionality of the infotainment providing system, and/or utilized to enable the vehicle occupant to interact therewith.

Additionally or alternatively, the infotainment providing system may, at least partly, be comprised in a user device, which user device is taken on-board the vehicle. The "user device" may in this context be a mobile user device, which mobile user device further may have navigating abilities. The "user device" may accordingly refer to, for instance, a multi-functional smart phone, mobile phone, mobile terminal or wireless terminal, portable computer such as a laptop, PDA or tablet computer, surf plate such as an iPad, Pocket PC, and/or mobile navigation device. The "user device" may comprise resources adapted for functionality control thereof, such as microphone(s), speaker(s), input/control devices such as physical push buttons, rocker buttons, dials, slider switches, sticks, and/or a touchpad. The "user device" may further comprise one or several displays, such as touch sensitive displays, commonly utilized to display e.g. graphic, video, digital images, animations and text, and further utilized to display e.g. virtual buttons, menus, and other user-interface objects to thereby provide a user interface through which a vehicle occupant, for instance the driver, may interact with the "user device". Accordingly, the resources of the "user device", such as the microphone(s), loudspeaker(s), input/control devices and/or display(s), may be utilized to provide functionality of the infotainment providing system, and/or utilized to enable the vehicle occupant to interact therewith.

Moreover, the "user device" may be adapted to communicate with the vehicle. The expression of the user device being adapted to "communicate with the vehicle", may refer to the user device being configured to be in communication with the vehicle, e.g. the in-vehicle system thereof, such that information and/or data may be transferred between the vehicle and the user device. Such communication may for instance be accomplished physically, such as via USB connection, and/or wirelessly, such as via Bluetooth, WiFi, or the like; additionally or alternatively, the connection may be accomplished via an intermediate system adapted to communicate with one or more vehicles, for instance a management and/or assisting system such as e.g. Volvo On Call.

Said expression may further refer to the user device being adapted to be "paired" and/or adapted to "be in connection" with the vehicle. The "user device" may in that context be referred to as a "nomadic device". Possibly, in order to be paired, identification of the nomadic device may be necessary, and/or authentication of the vehicle occupant, e.g. the driver. While the nomadic device is paired, the vehicle occupant may utilize functionality of the infotainment providing system in the nomadic device, via the in-vehicle system. Accordingly, previously discussed resources of the in-vehicle system may be utilized to provide functionality of the infotainment providing system, and/or utilized to enable the vehicle occupant to interact therewith.

Furthermore, the infotainment providing system is adapted to have online abilities, for instance by supporting Wifi functionality, or by being adapted to be in radio communication with a radio communications network, such as cellular communications network, e.g. LTE, EDGE, CDMA, 4G, 3G, GPRS, or GSM, e.g. via the vehicle, such as via the in-vehicle system described above, and/or via the user device described above.

Since the infotainment providing system determines at least a first infotainment category of interest, preferences of a user as to which infotainment topics are of his or her liking, may be established. That is, a user, e.g. vehicle driver, may provide input to the infotainment providing system as to which categories he or she prefers. Such input may, for instance, be provided via a user interface, with which the user may interact by means of the resources, e.g. a touch display, of the in-vehicle system and/or user device discussed in the foregoing. The user interface may, for instance, present a list of available selectable categories, such as a preference filter, from which the user may filter out categories of interest, i.e. preferred categories. Additionally or alternatively, the user may specify one or more categories of interest on his or her own. In the scenario of absence of user input as to which categories are preferred, pre-stored settings of the at least first infotainment category of interest may be utilized as input.

The categories may refer to any arbitrary topics relating to infotainment content, for instance "Music", "News", "History", "Restaurants", "Stores", "Tourist information" etc. Moreover, the categories may comprise subcategories. That is, a category of e.g. "Music" may, for instance, comprise subcategories, such as genres, for instance "Pop", "Ballads", "Country", "Rock" etc. The expression "categories of interest" may, for instance, refer to "preferred categories", "topics of interest", and/or "preferred topics", whereas "determining" throughout this disclosure may refer to, for instance, "identifying", "establishing", "receiving", "retrieving", "reading", "fetching", "requesting", "deriving", "becoming aware of" and/or "learning of".

Since the infotainment providing system determines a current position of the vehicle, a location at which the vehicle is currently located, is established. Determining the current vehicle position, e.g. the vehicle's GPS position, may take place periodically, essentially constantly and/or on request. Moreover, determining the current position of the vehicle may be achieved in any commonly known manner, and may for instance refer to GPS positioning, Wifi positioning and/or cellular positioning, e.g. accomplished by means of the previously discussed in-vehicle system of the vehicle, a navigation system and/or the previously discussed user device on-board the vehicle. The position of the vehicle may thus, according to some embodiments, be represented by the position of the user device. Additionally and/or alternatively, a stored vehicle position value may be fetched, e.g. from a remote database holding dynamic position values, such as the previously discussed intermediate system adapted to communicate with one or more vehicles and to hold updated positions of the vehicles. The expression "current position" may refer to, for instance, "prevailing position", "position at a current or prevailing point of time", and/or "position at an essentially current or essentially prevailing point of time". Moreover, "current position" may likewise include "essentially current position".

Since the infotainment providing system searches at least a first online information source, such as a first predetermined online information source, based on the at least first infotainment category of interest and taking into consideration the determined vehicle position, a search of content in one or more trusted online information sources is performed, taking into account category preferences established in the infotainment providing system, as well as the established position of the vehicle. Thereby, a search is initiated partly based on input data derived from the at least first infotainment category of interest. For instance, the search may be partly based on the one or more titles of the at least first infotainment category of interest, such as e.g. "History". The term "based on" may in this context refer to "considering", "taking into account" and/or "taking into consideration".

Moreover, the initiated search additionally takes into consideration input data derived from the determined vehicle position. The term "taking into consideration" the determined vehicle position, may in this context refer to, for instance, "based on", "considering", "taking into account", "based on a region associated with" and/or "based on a region overlapping or being close to" the determined vehicle position. For instance, the search may additionally be based on GPS coordinates of the determined vehicle position, and/or a region associated therewith, such as region, city, county, state, and/or country overlapping, or being close to, the determined vehicle position. Such a region may be established in any arbitrary known manner, e.g. prior to the search in the at least first online information source. Said region may, for instance, be derived from map data, such as digital map data, comprised in a navigation system of e.g. the previously discussed in-vehicle system of the vehicle and/or of the previously discussed user device on-board the vehicle.

The expression "at least a first online information source" may refer to any one or more arbitrary, e.g. trusted, content providers providing online content considered to be of value to the infotainment providing system. That is, the infotainment providing system searches one or more online information sources, which may be pre-selected prior to the search. Such a pre-selection may for instance be made based on pre-settings in the infotainment providing system, which pre-settings may be adjustable. The word "predetermined" may throughout this disclosure refer to, for instance, "preset" and/or "pre-selected". Moreover, such a pre-selection may additionally be based on the at least first category of interest, for instance the orientation thereof.

Since the infotainment providing system retrieves at least a first piece of media content which falls under the at least first infotainment category of interest and which is associated with the determined vehicle position, one or more pieces of media content associated with the one or more categories of interest, as well as associated with the determined vehicle position, is retrieved from the one or more online information sources. Thereby, media content pertinent the at least first infotainment category as well as the determined vehicle position, may be filtered out, and subsequently retrieved, from content of the at least first, e.g. predetermined, online information source. Consequently, the retrieved media content is considered "personalized" in that preferred categories of e.g. a user, such as the vehicle occupant, are input to the search; correspondingly, the retrieved media content is furthermore considered "position-based" in that the determined current position of the vehicle, and or a region overlapping and/or being close to the determined current position of the vehicle, as well, is input to the search.

The expression "retrieving from the one or more online information sources" may in this context refer to any arbitrary known manner of retrieving media content from one or more online information sources, and may for instance refer to "retrieving, from downloading by the at least first online information source" and/or "retrieving, from streaming by the at least first online information source". Moreover, the word "retrieving" may further refer to, for instance, "fetching", "receiving", "requesting", "deriving" and/or "reading". According to an example, the media content may be retrieved by e.g. webcasting and/or podcasting functionality. The expression "piece of media content" may refer to "media content element". Furthermore, the expression of the at least first piece of media content additionally "being associated with" the determined vehicle position, may in this context refer to, for instance, said media content additionally "taking into account", "taking into consideration", and/or "being based on" the determined vehicle position.

The expression of the at least first piece of media content which "falls under" the at least first infotainment category of interest, may in this context refer to, for instance, said media content "being associated with", "being labelled to be associated with", and/or "being categorized to be associated with" the at least first infotainment category of interest. Accordingly, the at least first piece of media content may be derived from content on e.g. an internet page, which content may be comprised in a section under a e.g. title, headline, and/or heading coinciding with, or comprising, the at least first category of interest; additionally or alternatively, said content may have a label or reference which coincides with, or comprises, the at least first category of interest.

The expression "media content" may in this context refer to any arbitrary content element having infotainment value, and which may be retrievable from an online information source. Thus, the "media content" may refer to one or a combination of content elements from the non-exhaustive list of audio, video, and/or information clips or files, such as e.g. a music clip, a news clip, a text file etc. Moreover, a media content element may be refined. Thus, e.g. a piece of text may be transformed to e.g. a piece of audio, in any manner known in the art, for instance by means of commonly known text-to speech, TTS.

Consequently, according to one example, the "at least a first piece of media content which falls under the at least first infotainment category of interest and which is associated with the determined vehicle position", may thus be represented by, for instance, should the at least first category of interest comprise e.g. "Music", a song and/or video by an artist born in a region in, or close to, the determined vehicle position, which song and/or video may have been retrieved from e.g. commonly known online information source "Spotify".

Moreover, according to another example, the "at least a first piece of media content which falls under the at least first infotainment category of interest and which is associated with the determined vehicle position", may be represented by, for instance, should the at least first category of interest comprise e.g. "News", be represented by a local news clip with content adapted to a region in, or close to, the determined vehicle position, which news clip may have been retrieved from e.g. commonly known online information source "BBC News".

Since the infotainment providing system provides the at least first piece of media content while the vehicle is in the vicinity of the determined vehicle position, said media content is only available until the vehicle is considered to no longer be in the vicinity of the determined position. That is, the first piece of media content is only considered to constitute position-based infotainment as long as an updated position of the vehicle is considered to be in vicinity of the previous determined vehicle position discussed in the foregoing. In that manner, the at least first piece of media content may—upon it being determined that an updated position of the vehicle is no longer in said vicinity—be discarded, for instance deleted from the infotainment providing system and/or blocked. Thereby, it is ensured that only local-based infotainment is provided.

The word "providing" may in this context refer to, for instance, "making available" and/or "supplying", whereas the word "while" in this context may refer to, for instance, "meanwhile", "as", "during" and/or "when". Moreover, the expression of the vehicle being "in the vicinity of" the determined vehicle position may, for instance, refer to an updated determined position of the vehicle being "close to", "nearby", "within a relatively short distance from" and/or "in the same region as" the previously determined vehicle position. A definition of what of constitutes the "vicinity" may be predetermined and/or adjustable, and may for instance refer to a maximum distance from a determined vehicle position of e.g. 100, 1 000, or 10 000 metres. Additionally or alternatively, the "vicinity" may refer to e.g. a predefined arbitrarily sized and/or shaped area, which area may overlap the previously determined position of the vehicle. Since the vehicle may be moving, what is considered to constitute the "vicinity" may change. Moreover, the definition of what constitutes "the vicinity" may vary with the current number of media content elements in the infotainment media playlist. For instance, should the number of media content elements in said playlist fall short of an arbitrary number, e.g. 2, 5 or 10, then what constitutes "the vicinity" may be broadened, and vice versa.

According to an embodiment, the infotainment providing system may further add the at least first piece of media content to an infotainment media playlist comprised in the infotainment providing system, which infotainment media playlist is accessible by an occupant of the vehicle. Thereby, a playlist comprising one or more personalized position-based infotainment media elements is created, which playlist is administrable by a vehicle occupant, e.g. the driver of the vehicle. The infotainment media playlist may comprise any arbitrary number of pieces of media content, i.e. media content elements, and a piece of media content may further be of any arbitrary file size. The word "adding" may in this context refer to, for instance, "storing", "streaming", and/or "downloading", whereas "assessable" for instance may refer to "administrable" and/or "changeable".

Titles of the one more pieces of media content in the infotainment media playlist, which titles may be named arbitrarily although preferably reflecting the respective media content with which they are associated, may be presented to the vehicle occupant, in order to inform him or her of contents of the playlist. Said titles may be presented via a playlist presentation medium associated with the vehicle, e.g. comprised in the previously discussed in-vehicle system, and/or comprised in the previously discussed user device on-board the vehicle. That is, the titles of the one or more pieces of media content of the infotainment media playlist may be presented by means of the previously discussed resources of the in-vehicle system and/or by means of the previously discussed resources the user device on-board the vehicle. According to one example, one or more displays are utilized to visually display the titles and/or images of the media content elements of the infotainment media playlist. According to another example, one or more loudspeakers are utilized to audibly present the titles of the media content elements of the infotainment media playlist. According to yet another example, both displays and loudspeakers are utilized.

Moreover, the infotainment media playlist may be accessible, for instance, via one or more user interfaces. Accordingly, a vehicle occupant may administer the one or more pieces of media content comprised in the infotainment media playlist, for instance, via the previously discussed resources of the in-vehicle system and/or via the previously discussed resources the user device on-board the vehicle. The vehicle occupant may hence, for instance, delete and/or rearrange the order of at least some of the media content elements in the infotainment media playlist, by administrating the presented titles of the media content elements of the list, to thereby adapt the content and/or order of the infotainment media list, to his or her liking.

According to another embodiment, the infotainment providing system may further present at least a portion of content of the at least first piece of media content via a media content presentation medium associated with the vehicle and/or associated with a user device on-board the vehicle. Thereby, content of the one or more media content elements may be presented to a vehicle occupant, for instance audibly and/or visually. The expression of "media content presentation medium associated with the vehicle and/or associated with a user device on-board the vehicle", may refer to presentation means comprised in, for instance, the in-vehicle system and/or user device discussed above. That is, the at least a portion of content of the at least first piece of media content may, for instance, be presented by means of the previously discussed resources of the in-vehicle system and/or by the previously discussed resources the user device on-board the vehicle. According to one example, one or more loudspeakers are utilized to audibly present said content. According to another example, one or more displays are utilized to visually display said content. According to yet another example, both displays and loudspeakers are utilized.

The word "presenting" may in this context refer to, for instance, "playing". Moreover, the expression presenting "at least a portion" of content of the at least first piece of media content, may in this context range from presenting merely a fraction of the first media content element, to presenting an entirety thereof. The presentation of the at least a portion of content of the at least first piece of media content may, for instance, be stopped, paused, fast-forwarded, re-winded, and/or deleted via a previously discussed user interface discussed above, for instance by the vehicle occupant.

According to yet another embodiment, the infotainment providing system may search at least a first publicly available online information source. Thereby, one or more publically available online content providers, which for instance may be available via the Internet, may be targeted for the search. Accordingly, public online content providers providing, for instance, encyclopedic content, news content, music content and/or video content, may be selected. Examples of the at least first, e.g. predetermined, publicly available online information source may hence include one or more from the non-exhaustive list of commonly known "Wikipedia", "BBC News", "Spotify", "Echo Nest", "rdio", "Youtube", "Pandora", "WiMP" etc. Retrieving media content, such as for instance music from a music online content provider, such as e.g. Spotify, or for instance news from a news online content provider, such as e.g. BBC News, may require the user, such as the vehicle occupant, the vehicle, an optional user device on-board the vehicle and/or the infotainment providing system, to be a subscriber thereto.

Additionally or alternatively, the infotainment providing system may search at least a first non-public online information source, which at least first non-public online information source comprises one or more databases to which said vehicle, the infotainment providing system, a user device associated with the vehicle, and/or a vehicle occupant of the vehicle, is allowed at least partial access. Thereby, one or more, e.g. predetermined, non-public online information sources may be targeted for the search, such as non-public content providers providing arbitrary user-restricted content. The at least first non-public online information source may comprise, for instance, arbitrary content which may be of interest, for instance intended to be provided, to one or more vehicles, vehicle occupants, user devices associated with vehicles and/or infotainment providing systems. Said content, which for instance may relate to commercial offers and/or advertisement, may furthermore for instance be geo-tagged, i.e. associated with and/or labelled with e.g. geographical coordinates, whereby a specific piece of content hence may be applicable to a vehicle and/or occupant thereof passing by the location with which said specific content is associated. Said content may furthermore depend on vehicle status; that is, one piece of content, for instance a commercial offer, may be applicable to a vehicle determined to have a certain vehicle status, while another piece of content, for instance another commercial offer, may be applicable to a vehicle determined to have another certain status.

The at least first non-public online information source may additionally or alternatively comprise, for instance, vehicle-related, traffic-related and/or infrastructure-related content, which may be geo-tagged, provided by e.g. a vehicle and/or a vehicle occupant, which content may be of interest to other vehicles and/or vehicle occupants, such as a geo-tagged traffic congestion experiences. Furthermore, the at least first non-public online information source may additionally or alternatively comprise, for instance, arbitrary content, e.g. geo-tagged, sharable between different vehicles and/or vehicle occupants who may be members of a specific community of interest.

Retrieving media content from the one or more non-public online information sources may require the user, e.g. the vehicle occupant, the vehicle, an optional user device associated with the vehicle, and/or the infotainment providing system, to be e.g. a member or a subscriber of said non-public online information source. Furthermore, the expression of being allowed "at least partial access" to the one or more databases, may in this context refer to being allowed access to merely a fraction of the one or more databases or merely a fraction of the content of the one or more databases, to being allowed full access thereto. Moreover, the "one or more databases" may be arbitrarily located, for instance at different remote locations.

According to still another embodiment, the at least first piece of media content may comprise an audio clip comprising one or a combination of music, news, advertisement and/or information. Thereby, the one or more media content elements may comprise infotainment media content of audio format. Accordingly, the infotainment providing system may appear to provide a personalized local radio channel. Moreover, since the at least first piece of media content according to this embodiment is an audio clip, rather than e.g. a video clip or piece of displayed text, said audio clip may not in the same manner invite the e.g. vehicle driver to take his or her eyes off the road.

According to one embodiment, the infotainment providing system may further determine vehicle status data comprising one or more status data parameters reflecting current vehicle status. The infotainment providing system then searches at least a first online information source, based on the first infotainment category of interest and taking into consideration the determined vehicle position, and additionally taking into consideration a first vehicle status data parameter. Moreover, the infotainment providing system then retrieves at least a first piece of media content which falls under the at least first infotainment category of interest and which is associated with the determined vehicle position, and which additionally is associated with the vehicle status data. Thereby, yet another piece of input is considered in the search in the one or more online information sources, namely at least a first vehicle status data parameter reflecting a current vehicle status. Subsequently, the retrieved one or more media content elements are according to this embodiment selected by additionally taking into account the vehicle status data. Accordingly, the search is affected by the value of at least a first vehicle status data parameter, hence enabling the infotainment providing system to in addition to providing personalized and position-based infotainment, additionally provide infotainment which furthermore takes into account determined vehicle status.

That is, since the infotainment providing system according to this embodiment determines vehicle status data comprising one or more status data parameters reflecting current vehicle status, the infotainment providing system establishes a current vehicle status pertinent a prevailing vehicle situation. The expression "status data parameters reflecting current vehicle status" may refer to status data elements revealing, indicating and/or comprising prevailing status values of parameters associated with the vehicle. "Current vehicle status" is throughout this disclosure intended to be interpreted as "essentially current vehicle status", thus likewise including e.g. "recently prevailing vehicle status". The expression of the infotainment providing system "determining" vehicle status data may in this context refer to the infotainment providing system "establishing", "learning of", "receiving", "retrieving", "reading" and/or "fetching" vehicle status data. For instance, the one or more status data parameters may already be known by concurrent systems of e.g. the vehicle, and may thus be available to the infotainment providing system. Moreover, determining of vehicle status data may take place periodically, essentially constantly and/or on request.

The vehicle status data may, for instance prior to, during, or after the search, be compared with predetermined status data criteria. That is, values of the one or more status data parameters reflecting current vehicle status, or essentially current vehicle status, may be compared with corresponding preference parameters of the status data criteria. Thereby, a value of a status data parameter e.g. exceeding or being short of a e.g. threshold stated in the corresponding preference parameter, may be identified, e.g. "filtered out" as interesting. The "predetermined status data criteria", which may be adjustable, may be set to values considered appropriate for the situation at hand.

By taking the vehicle status data into consideration in the search of content in the at least first online information source, for instance in the search of content in the one or more non-public online information sources, content which is not only pertinent the determined at least first category of interest and the determined vehicle position, but additionally pertinent the determined vehicle status, may be selected and subsequently retrieved. Thus, content may be retrieved and subsequently provided relating to, for instance, commercial offers, deals, discounts, and/or advertising, information and/or curiosa—which depend on the determined vehicle status data—from entities which the vehicle passes by, which entities at least to some extent are associated with or falls under the one or more categories of interest. The word "entity" may in this context refer to, for instance, a business or municipal operation or organization, providing products or services. Examples include restaurants, stores, hotels, fuel stations, service stations and the like.

According to an example, by comparing at least a first vehicle status data parameter of the vehicle status data, e.g. a parameter reflecting a current or essentially current vehicle fuel level, with predetermined status data criteria, e.g. a fuel level threshold preference, the infotainment providing system may determine that if the current vehicle fuel level is below the fuel level threshold, it is assumed that the vehicle at the prevailing moment is, or is about to become, in need of refuelling. Thus, in the scenario of the one or more categories of interest comprising a preference for, for instance, fuel stations and/or for receiving commercial offers from arbitrary local entities, the infotainment providing system may hence, following a search taking into consideration the determined at least first category of interest, here e.g. "fuel station", the determined vehicle position and/or a region associated therewith, and the determined vehicle status data, here the low fuel level, retrieve and subsequently provide e.g. a commercial offer, e.g. a fuel discount offer, from a fuel station in vicinity of, for instance ahead of, the vehicle.

According to another example, in a similar manner, by comparing e.g. a vehicle status data parameter reflecting a current or essentially current washer fluid level, with a fuel level threshold preference, the infotainment providing system may determine that if the current washer fluid level is below the washer fluid threshold preference, it is assumed that the vehicle at the prevailing moment is, or is about to become, in need of refilling washer fluid. Thus, in the scenario of the one or more categories of interest comprising a preference for, for instance, fuel stations and/or for receiving commercial offers from arbitrary local entities, the infotainment providing system may hence, following a search taking into consideration the determined at least first category of interest, here e.g. "fuel station", the determined vehicle position and/or a region associated therewith, and the determined vehicle status data, here the low washer fluid level, retrieve and subsequently provide e.g. advertisement from a fuel station in vicinity of, for instance ahead of, the vehicle.

According to yet another example, in a similar manner, by comparing e.g. a vehicle status data parameter reflecting a current or essentially current vehicle information status of the vehicle, for instance a current or essentially current driver alert status, with a driver alert status preference, the infotainment providing system may determine that if the current driver alert status e.g. is above a threshold, it is assumed that the vehicle driver currently is e.g. drowsy, and hence may be in need of coffee. Thus, in the scenario of the one or more categories of interest comprising a preference for, for instance, coffee shops and/or for receiving commercial offers from arbitrary local entities, the infotainment providing system may hence, following a search taking into consideration the determined at least first category of interest, here e.g. "coffee shops", the determined vehicle position and/or a region associated therewith, and the determined vehicle status data, here the high level of driver alert status, retrieve and subsequently provide e.g. a commercial offer, for instance a discount offer, from a coffee shop in vicinity of, for instance ahead of, the vehicle.

According to still another example, in a similar manner, by comparing e.g. a vehicle status data parameter reflecting a current number of vehicle occupants, with a preference for number of vehicle occupants, the infotainment providing system may determine that if the current number of vehicle occupants, e.g. two, is higher than or equal to the preference for number of vehicle occupants, e.g. two, advertisement and/or offers taking into account that there are two, or more than two, vehicle occupants in the vehicle, may be of interest. Thus, in the scenario of the one or more categories of interest comprising a preference for, for instance, coffee shops and/or for receiving commercial offers from arbitrary local entities, the infotainment providing system may hence, following a search taking into consideration the determined at least first category of interest, here e.g. "coffee shops", the determined vehicle position and/or a region associated therewith, and the determined vehicle status data, here that there are two or more vehicle occupants, retrieve and subsequently provide e.g. a commercial offer, for instance "2 cups of coffee for the price of 1", from a coffee shop in vicinity of, for instance ahead of, the vehicle.

According to one more example, in a similar manner, by comparing e.g. a vehicle status data parameter reflecting a current time of vehicle journey, for instance how long the vehicle has been travelling since a journey started, with a time of journey threshold preference, the infotainment providing system may determine that if the current time of journey for the vehicle, for instance 60 minutes, is above a time of journey threshold of e.g. 60 minutes, the infotainment providing system may consider that one or more of the vehicle occupants may be receptive to advertisement relating to e.g. food. Thus, in the scenario of the one or more categories of interest comprising a preference for, for instance, restaurants and/or for receiving commercial offers from arbitrary local entities, the infotainment providing system may hence, following a search taking into consideration the determined at least first category of interest, here e.g. "restaurants", the determined vehicle position and/or a region associated therewith, and the determined vehicle status data, here that the current time of vehicle journey has reached the threshold of e.g. 60 minutes, retrieve and subsequently provide e.g. advertisement from a restaurant in vicinity of, for instance ahead of, the vehicle.

According to still one more example, in a similar manner, by comparing e.g. a vehicle status data parameter reflecting a current time of vehicle presence in a predefined region, with a preference threshold for time of vehicle presence in a predefined region, the infotainment providing system may determine that if the current time of vehicle presence, for instance 60 minutes, is above a preference threshold time of e.g. 60 minutes, the infotainment providing system may consider that a previous e.g. ignored restaurant offer may now be of interest to one or more of the vehicle occupants. Thus, in the scenario of the one or more categories of interest comprising a preference for, for instance, restaurants and/or for receiving commercial offers from arbitrary local entities, the infotainment providing system may hence, following a search taking into consideration the determined at least first category of interest, here e.g. "restaurants", the determined vehicle position and/or a region associated therewith, and the determined vehicle status data, here that the current time of vehicle presence in a predetermined region has exceeded the threshold of e.g. 60 minutes, retrieve and subsequently once more provide a previously provided offer, for instance a dinner discount offer, from a restaurant in vicinity of, for instance ahead of, the vehicle.

According to a second embodiment herein, the object is achieved by an infotainment providing system adapted for providing personalized position-based infotainment in a vehicle. The infotainment providing system comprises a category determining unit adapted for determining at least a first infotainment category of interest. The infotainment providing system furthermore comprises a position determining unit adapted for determining a current position of the vehicle. Moreover, the infotainment providing system comprises a searching unit adapted for searching at least a first online information source, such as a first predetermined online information source, based on the at least first infotainment category of interest and taking into account the determined vehicle position. The infotainment providing system further comprises a retrieving unit adapted for retrieving at least a first piece of media content which falls under the at least first infotainment category of interest and which is associated with the determined vehicle position. Furthermore, the infotainment providing system comprises a providing unit adapted for providing the at least first piece of media content while the vehicle is in the vicinity of the determined vehicle position.

According to an embodiment, the infotainment providing system may further comprise an adding unit adapted for adding the at least first piece of media content to an infotainment media playlist comprised in the infotainment providing system, which infotainment media playlist is accessible by an occupant of the vehicle.

According to another embodiment, the infotainment providing system may further comprise a presenting unit adapted for presenting at least a portion of content of the at least first piece of media content via a media content presentation medium associated with the vehicle and/or associated with a user device on-board the vehicle.

According to yet another embodiment, the searching unit may be adapted for searching at least a first publicly available online information source. Additionally or alternatively, the searching unit may be adapted for searching at least a first non-public online information source, which at least first non-public online information source comprises one or more databases to which the vehicle, the infotainment providing system, a user device associated with the vehicle, and/or a vehicle occupant of the vehicle, is allowed at least partial access.

According to still another embodiment, the at least first piece of media content may comprise an audio clip comprising one or a combination of music, news, advertisement and/or information.

According to one embodiment, the infotainment providing system may further comprise a vehicle status determining unit adapted for determining vehicle status data comprising one or more status data parameters reflecting current vehicle status. The searching unit is then adapted for searching at least a first online information source, based on the first infotainment category of interest and taking into consideration the determined vehicle position, and additionally taking into consideration at least a first vehicle status data parameter. Moreover, the retrieving unit is then adapted for retrieving at least a first piece of media content which falls under the at least first infotainment category of interest and which is associated with the determined vehicle position, and which additionally is associated with the vehicle status data.

Similar advantages as those mentioned in the foregoing in relation to the first embodiment correspondingly apply to the second embodiment, and these advantages are not further discussed.

According to a third embodiment herein, the object is achieved by a vehicle comprising at least a portion of the infotainment providing system discussed above. Once again, similar advantages as those mentioned in the foregoing in relation to the first embodiment correspondingly apply to the third embodiment, and these advantages are not further discussed.

According to a fourth embodiment herein, the object is achieved by a user device comprising at least a portion of the previously discussed infotainment providing system. Once more, similar advantages as those mentioned in the foregoing in relation to the first embodiment correspondingly apply to the fourth embodiment, and these advantages are not further discussed.

According to a fifth embodiment herein, the object is achieved by a computer program product comprising a computer program containing computer program code means arranged to cause a computer or a processor to execute the steps of the infotainment providing system discussed in the foregoing, stored on a computer-readable medium or a carrier wave. Yet again, similar advantages as those mentioned in the foregoing in relation to the first embodiment correspondingly apply to the fifth embodiment, and these advantages are not further discussed.

BRIEF DESCRIPTION OF THE DRAWINGS

The various features of the non-limiting embodiments of the disclosure, including particular features and advantages, will be readily understood from the following detailed description and the accompanying drawings, in which.

DETAILED DESCRIPTION

Figure 1:
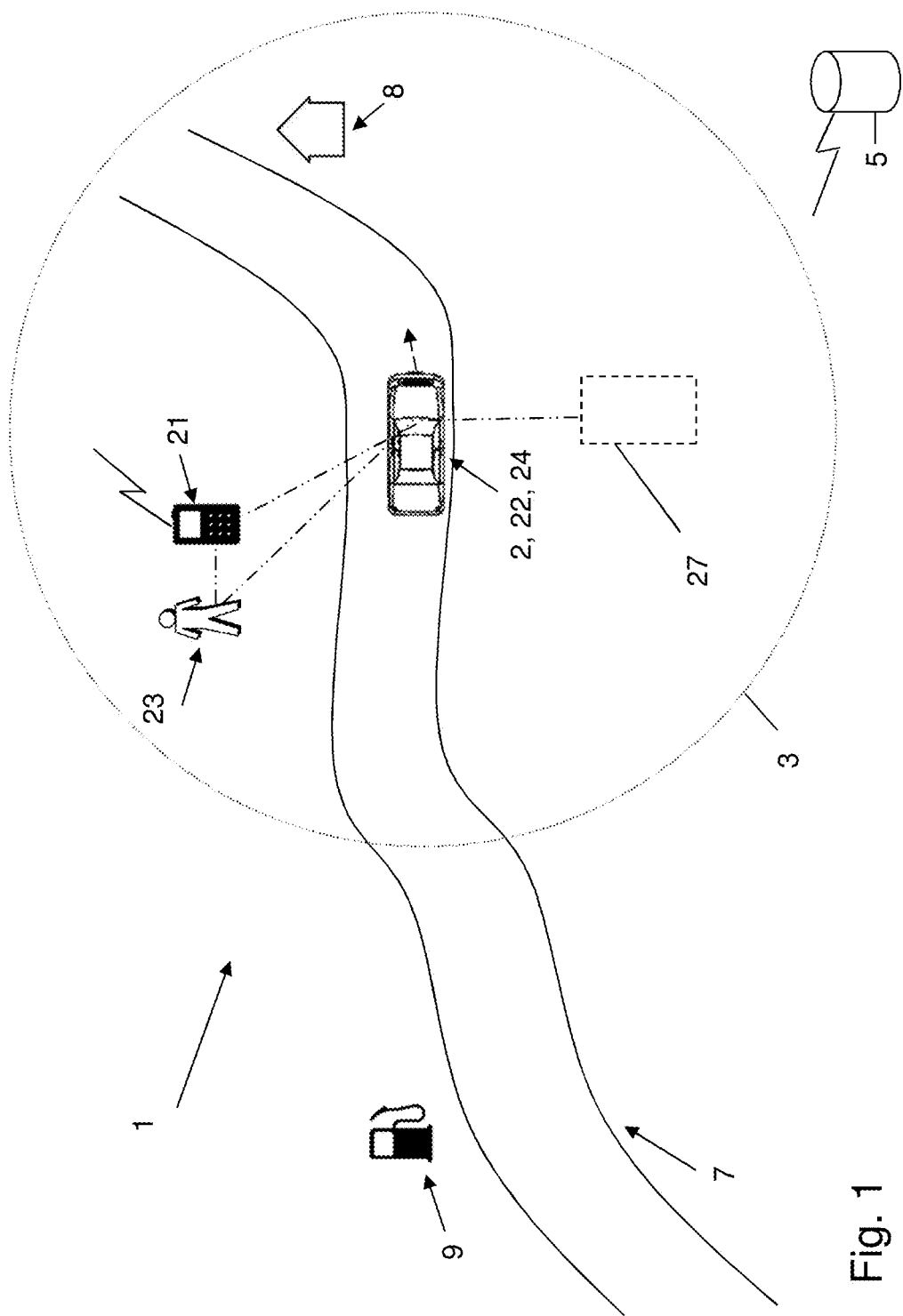
FIG. 1 illustrates a schematic overview of an exemplifying infotainment providing system comprised in a vehicle and/or in a user device, according to embodiments of the disclosure.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to providing personalized position-based infotainment in a vehicle, there will be disclosed that infotainment media content may be provided in a vehicle, in a dynamic, rather than static, manner.

Referring now to the figures and FIG. 1 in particular, there is depicted a schematic overview of an exemplifying infotainment providing system 1 comprised in a vehicle 2 and/or in a user device 21, according to embodiments of the disclosure.

The infotainment providing system 1, which will be described in further detail later on in this description, is adapted for providing personalized position-based infotainment in the vehicle 2. The user device 21, which for instance may be represented by a smart phone, is here associated with the vehicle 2 by being paired therewith, whereby it may be referred to as a nomadic device. The illustrated vehicle 2 is in the shown embodiment a car, comprising a vehicle occupant 23, driving along any suitable surface, such as an exemplifying arbitrary road 7, which may be represented by any surface along which the vehicle 2 may travel. The vehicle 2 is in the example currently situated at a determined current position 22. The determined vehicle position 22 is in the exemplifying embodiment represented by a position which is situated in, or near, Long Branch in the state of New Jersey.

Associated with said vehicle 2 and/or the user device 21 on-board the vehicle 2, is a media content presentation medium 24, which in the example is represented by one or more loudspeakers. The loudspeakers may be comprised in for instance an in-vehicle system of the vehicle 2; additionally or alternatively, the media content presentation medium 24 may be represented by one or more loudspeakers of the user device 21.

Moreover, optionally, associated with the vehicle 2 and/or the user device 21 on-board the vehicle 2, may be a playlist presentation medium 27. The playlist presentation medium 27 may be the same, or partially the same, as the media content presentation medium 24, i.e. at least a portion of the playlist presentation medium 27 may be represented by at least a portion of the media content presentation medium 24. According to the shown embodiment, however, the playlist presentation medium 27 may be represented by at least a first display 27 associated with the vehicle. 2. The optional display 27 is here represented by a display comprised in an in-vehicle system of the vehicle 2, for instance located in the instrument panel. Additionally or alternatively, the display 27 may be represented by a display of the user device 21. The display 27 is adapted to be accessible by the vehicle occupant 23, for instance the driver. The display 27 may for instance be represented by a touch display, thus providing a user-interface by means of which the vehicle occupant 23 may interact with the infotainment providing system 1.

Further depicted in the exemplifying embodiment is at least a first, e.g. predetermined, online information source 5, which will be described in further detail below. The infotainment providing system 1, the vehicle 2, the user device 21 and/or the vehicle occupant 23, has at least partial access to the at least first online information source 5.

Also depicted in the exemplifying embodiment of FIG. 1 is an optional first entity 8, which here is considered to be in the vicinity 3 of the determined vehicle position 22. The first entity 8 is in this example represented by a restaurant. Correspondingly, an exemplifying optional second entity 9, here represented by a fuel station, is considered not to be in the vicinity of the determined vehicle position 22.

Figure 2:
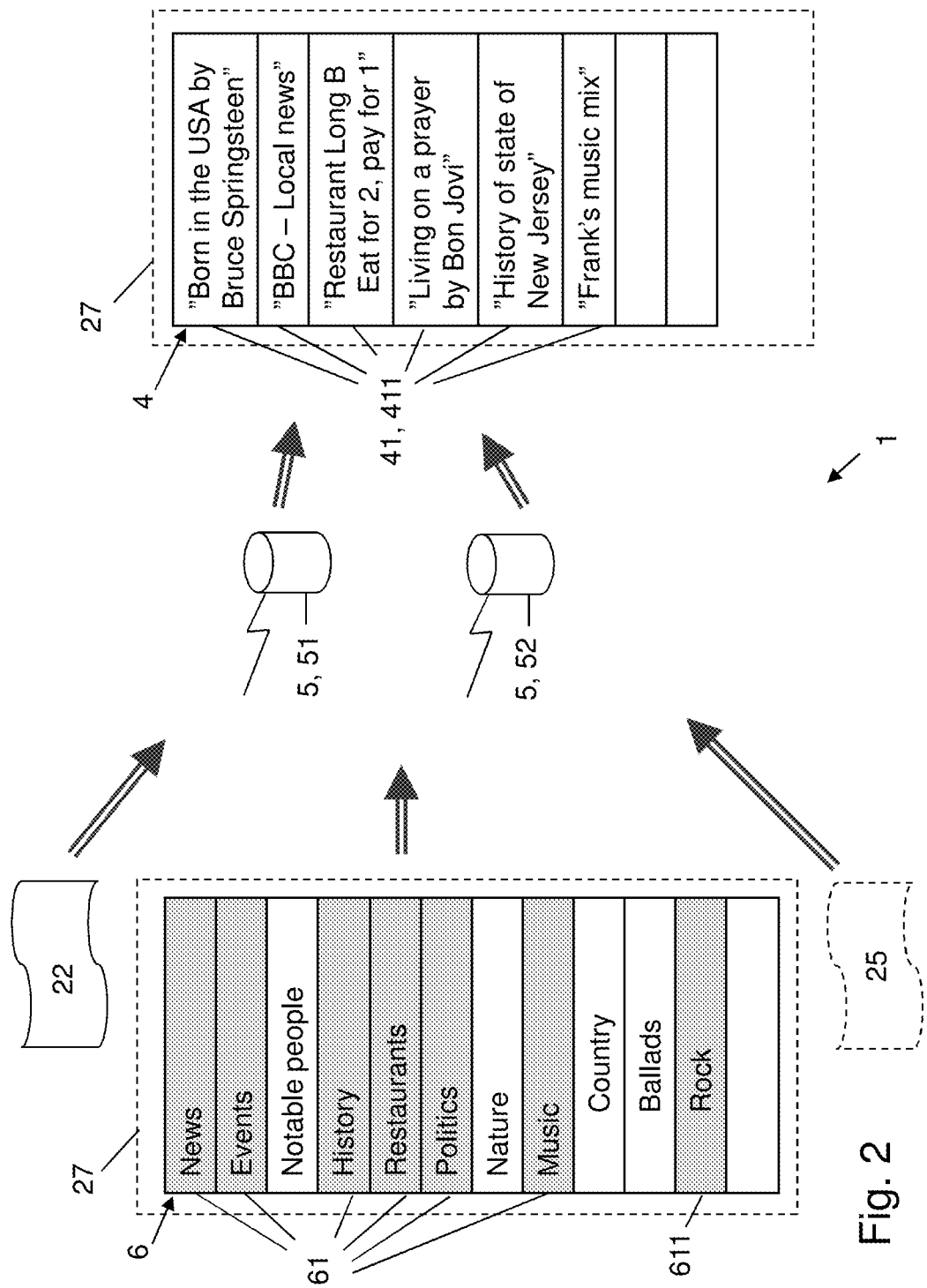
FIG. 2 illustrates a schematic overview of an exemplifying implementation of an infotainment providing system, according to embodiments of the disclosure.

FIG. 2 illustrates a schematic overview of an exemplifying implementation of an infotainment providing system 1, according to embodiments of the disclosure. Illustrated in the example is an optional preference filter 6, such as a category list, in which e.g. the vehicle occupant 23 may select at least a first infotainment category of interest 61.

Correspondingly, an infotainment category of interest 61 may be unselected. One or more of the categories in the optional preference filter 6 may comprise subcategories, for instance a plurality of music genres.

The optional preference filter 6 may for instance be provided by means of the touch display 27, via which e.g. the vehicle occupant 23 may administer the preference filter 6. Additionally or alternatively, the preference filter 6 may be administered by means of for instance buttons or knobs, such as steering wheel control buttons, and/or by means of voice commands.

Categories of interest 61, i.e. selected categories in the preference filter 6, e.g. selected by the vehicle driver, are in the example of FIG. 2 indicated by darkened background. Accordingly, the at least first category of interest 61 is here represented by the non-exhaustive list of "News", "Events", "History", "Restaurants", "Politics", and "Music". Furthermore, the category of interest 61 represented by "Music", is here subdivided into a plurality of subcategories, here genres, namely exemplifying "Country", "Ballads" and "Rock". Out of said plurality of genres, "Rock" represents at least a first genre of interest 611, i.e. the genre "Rock" has been selected by the e.g. vehicle occupant 23, and is hence indicated by darkened background.

The at least first infotainment category of interest 61 is, along with the determined position 22 of the vehicle, considered input to the infotainment providing system 1. Furthermore, optionally, vehicle status data 25, which will be described in further detail later on in this description, may be considered input to the infotainment providing system 1.

Illustrated in FIG. 2 is furthermore the at least first online information source 5. The at least first online information source 5 is here represented by at least a first, e.g. predetermined, publicly available online information source 51. The at least first online information source 5 may, for instance, be represented by e.g. commonly known public online information providers such as content providers of encyclopedic content, e.g. "Wikipedia", of news content, e.g. "BBC News", and/or of music content, e.g. "Spotify", "Echo Nest", "rdio", "Youtube", "Pandora", "WiMP" etc.

The first online information source 5 is here additionally represented by at least a first, e.g. predetermined, non-public online information source 52. The at least first non-public online information source 52 comprises one or more databases to which the vehicle 2, the infotainment providing system 1, the user device 21 and/or the vehicle occupant 23 of the vehicle 2, is allowed at least partial access. The at least first non-public online information source 52 may comprise, for instance, arbitrary content which may be of interest, for instance intended to be provided, to one or more vehicles, vehicle occupants, user devices associated with vehicles and/or infotainment providing systems. Said content, which for instance may relate to commercial offers and/or advertisement, may furthermore for instance be geo-tagged, i.e. associated with and/or labelled with e.g. geographical coordinates, whereby a specific piece of content hence may be applicable to a vehicle and/or occupant thereof passing by the location with which said specific content is associated. Said content may furthermore depend on vehicle status; that is, one piece of content, for instance a commercial offer, may be applicable to a vehicle determined to have a certain vehicle status, while another piece of content, for instance another commercial offer, may be applicable to a vehicle determined to have another certain status.

Furthermore depicted in exemplifying FIG. 2, is an infotainment media playlist 4, which may comprise at least a first piece of media content 41. In the shown embodiment, the one or more media content elements 41 are audio clips comprising one or a combination of music, news, advertisement, and/or information. Here, optional titles 411 reflecting the respective media content 41 with which they are associated are provided by means of the touch display 27. The touch display 27 here provides the vehicle occupant 23 the ability to administer the infotainment media playlist 4, by administering said titles 411. Additionally or alternatively, the infotainment media playlist 4 may be administered by means of for instance buttons or knobs, such as steering wheel control buttons, and/or by means of voice commands.

Moreover, one media content element 41 is here represented by exemplifying "Born in the USA" by Bruce Springsteen, which is deemed a rock song by a local artist. Another media content element 41 is here represented by "BBC—Local News", which is deemed a local news clip. Yet another media content element 41 is here represented by "Restaurant Long B—Eat for 2, pay for 1", which is deemed an offer for two or more vehicle occupants at the restaurant 8 in the vicinity 3 of the determined vehicle position 22. Still another media content element 41 is according to the shown embodiment represented by "Living on a prayer" by Bon Jovi, which is deemed a rock song by yet another local artist. One other media content element 41 is here represented by "History of New Jersey", which is an audio clip comprising history curiosa of the state of New Jersey which is deemed to be a region overlapping the determined vehicle position 22. Moreover, yet another media content element 41 is here represented by exemplifying "Frank's music mix", which is an audio podcast which is geo-tagged with coordinates which are deemed to be in the vicinity 3 of the determined vehicle position 22.

Figure 3:
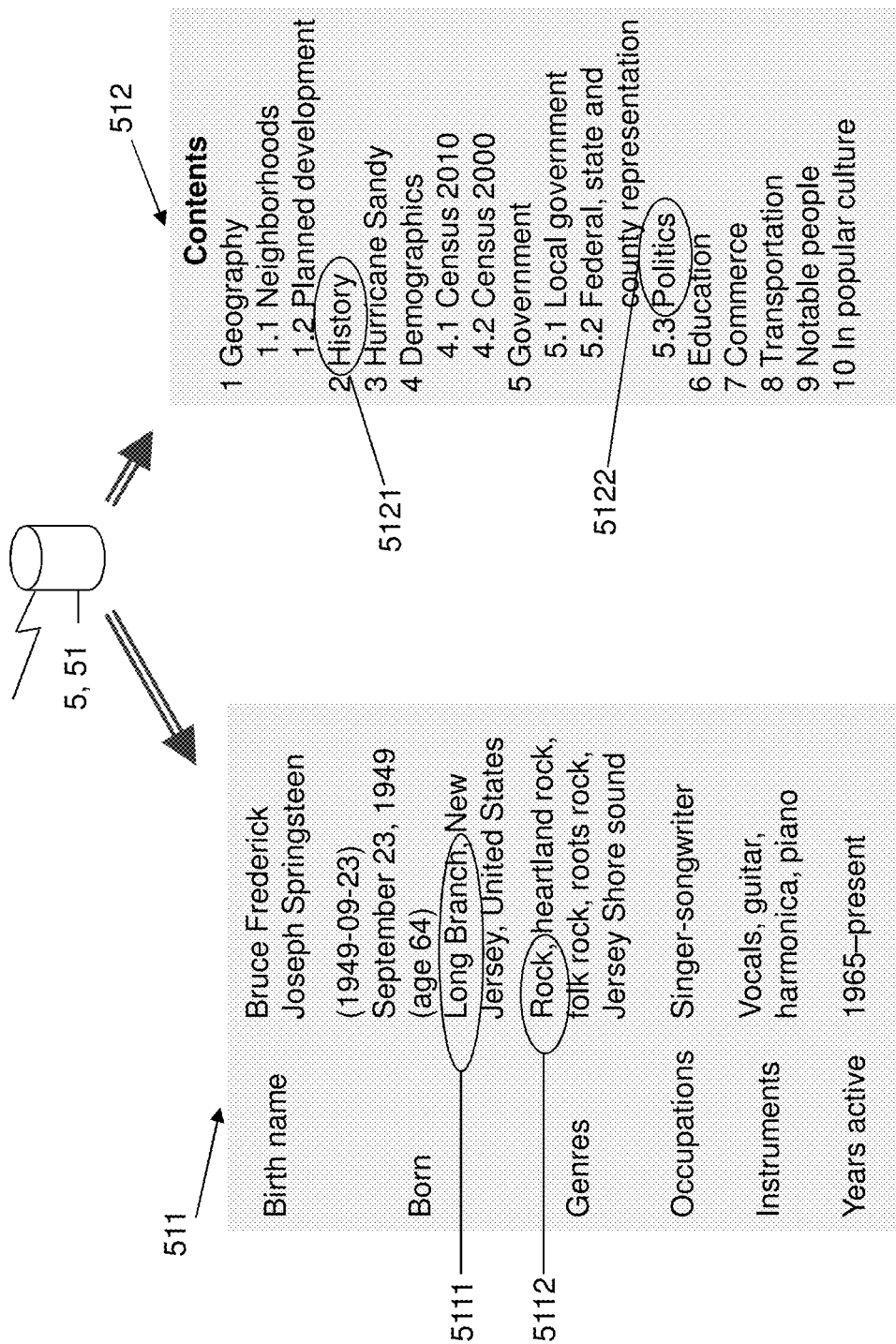
FIG. 3 illustrates a schematic overview of an exemplifying implementation of an infotainment providing system, according to embodiments of the disclosure.

FIG. 3 illustrates a schematic overview of an exemplifying implementation of an infotainment providing system 1, according to embodiments of the disclosure. Here, the at least first online information source 5 is represented by the at least first publically available information source 51, for instance the commonly known encyclopedic content provider "Wikipedia".

Depicted on the left hand side of FIG. 3, is an exemplifying extract of content 511 associated with one or more artists, which content 511 is available, e.g. searchable, in the at least first online information source 5, here "Wikipedia". As shown in the extract of content 511, "Long Branch" of state of New Jersey is stated to be a city of birth 5111 of an artist, here Bruce Springsteen. Furthermore, "Rock", among others, is indicated to be a music genre 5112 of said artist. It is to be noted that one or more information sources 51 comprising content relating specifically to "artists" is of interest, and may be targeted, according to this example, since one of the categories of interest 61 is represented by "Music". It is moreover to be noted that the city of birth 5111, i.e. "Long Branch", is a region overlapping the determined vehicle position 22. It is further to be noted that the music genre 5112, i.e. "Rock", coincides with the selected genre of interest 611.

Depicted on the right hand side of FIG. 3, is an exemplifying extract of content 512 associated with "Long Branch" and/or "New Jersey", which content 512 is available, e.g. searchable, in the at least first online information source 5, here "Wikipedia". As shown in the extract of content 512, there is, among others, a first label 5121 available named "History", and a second label 5122 available named "Politics". It is to be noted that one or more information sources 51 comprising content relating specifically to "Long Branch" and/or "New Jersey" is of interest, and may be targeted, according to this example, since "Long Branch" and/or "New Jersey" is a region overlapping the determined vehicle position 22. It is moreover to be noted that the first label 5121, here "History", as well as the second label 5122, here "Politics", respectively coincides with a respective selected category of interest 61.

Figure 4:
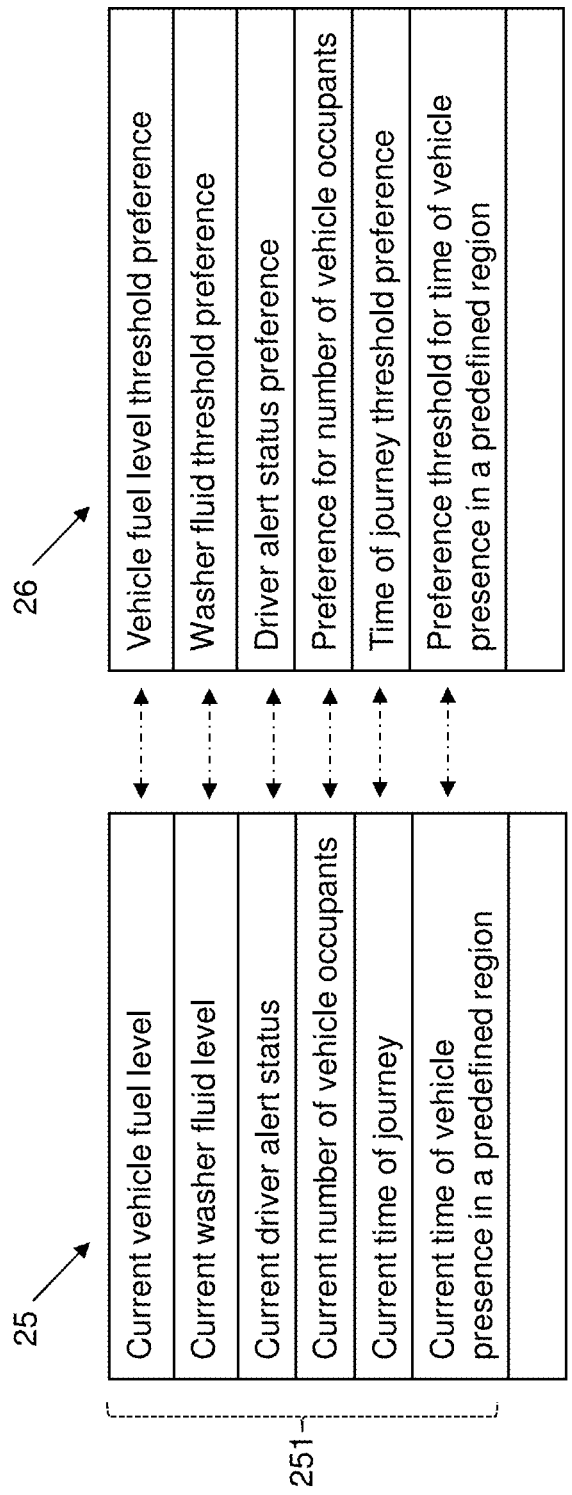
FIG. 4 illustrates exemplifying vehicle status data and exemplifying status data criteria, according to embodiments of the disclosure.

FIG. 4 illustrates exemplifying vehicle status data 25 and exemplifying status data criteria 26, according to embodiments of the disclosure. The vehicle status data 25, which will be described in more detail further on in this description, comprises one or more status data parameters 251 reflecting current vehicle status. Here, the vehicle status data 25 is represented by the one or more status data parameters 251 reflecting: "Current vehicle fuel level", "Current washer fluid level", Current driver alert status", Current number of vehicle occupants", "Current time of journey", and "Current time of vehicle presence in a predefined region".

Correspondingly, the status data criteria 26 may comprise one or more parameters reflecting criteria preferences, which criteria preferences the status data parameters 251 may be compared to. The status data criteria 26, which also will be described in more detail further on in this description, is here represented by the one or more preference parameters: "Vehicle fuel level threshold preference", "Washer fluid threshold preference", "Driver alert status preference", "Preference for number of vehicle occupants", "Time of journey threshold preference", and "Preference threshold for time of vehicle presence in a predefined region".

Figure 5:
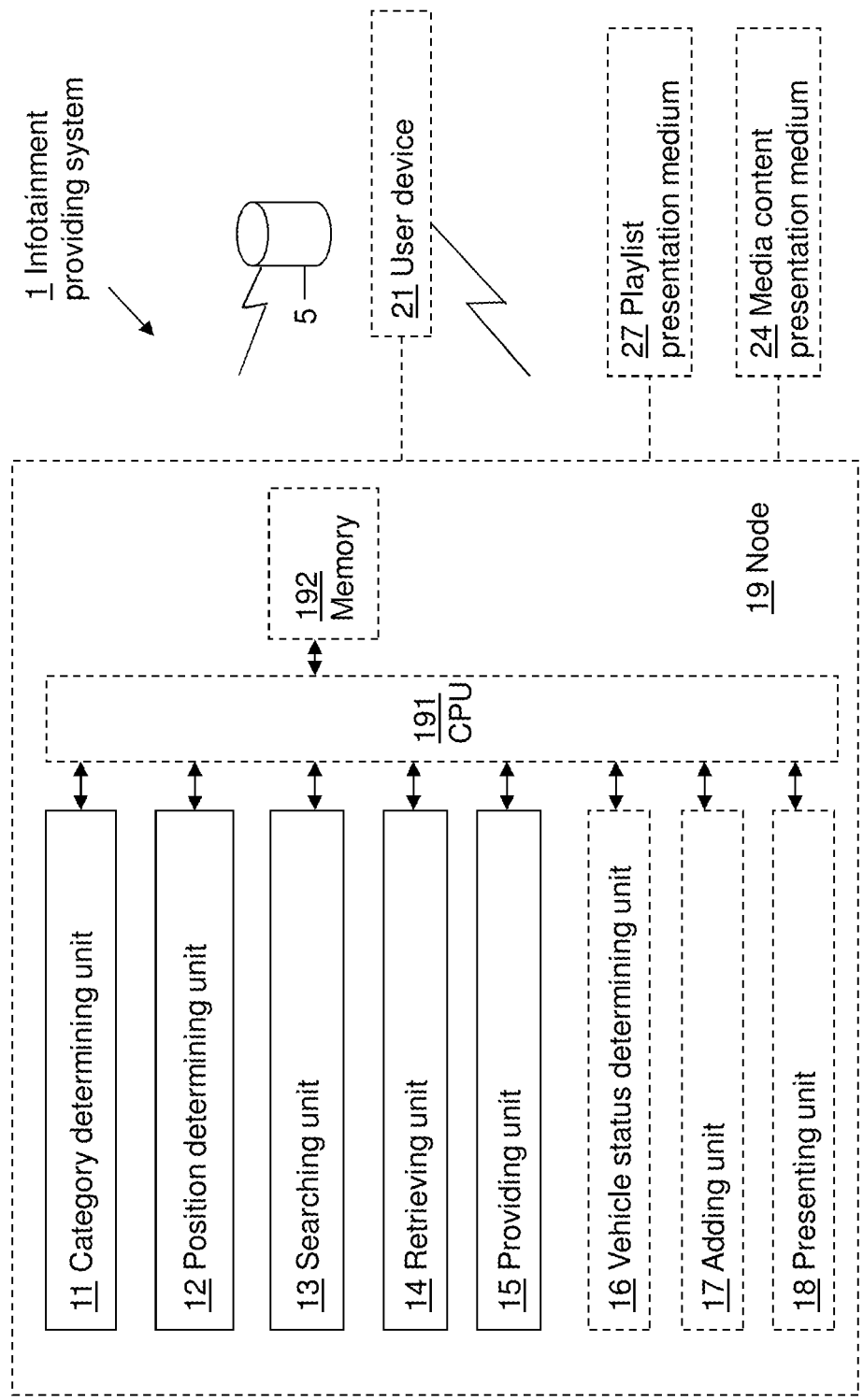
FIG. 5 is a schematic block diagram illustrating an exemplifying infotainment providing system according to embodiments of the disclosure.

As further shown in FIG. 5, which depicts a schematic block diagram illustrating an exemplifying infotainment providing system 1 according to embodiments of the disclosure, the infotainment providing system 1 is, as previously mentioned, adapted for providing personalized position-based infotainment in the vehicle 2. The infotainment providing system 1 comprises a category determining unit 11, a position determining unit 12, a searching unit 13, a retrieving unit 14 and a providing unit 15, all of which will be described in further detail below. Moreover, the infotainment providing system 1 may comprise an optional vehicle status determining unit 16, an optional adding unit 17 and/or an optional presenting unit 18, which in a similar manner will be described in further detail later on in this description.

Furthermore, the embodiments herein for providing personalized position-based infotainment in the vehicle 2, may be implemented through one or more processors, such as a processor 191, here denoted CPU, together with computer program code for performing the functions and actions of the embodiments herein. Said program code may also be provided as a computer program product, for instance in the form of a data carrier carrying computer program code for performing the embodiments herein when being loaded into the infotainment providing system 1. One such carrier may be in the form of a CD ROM disc. It is however feasible with other data carriers such as a memory stick. The computer program code may furthermore be provided as pure program code on a server and downloaded to the infotainment providing system 1.

The infotainment providing system 1 may further comprise a memory 192 comprising one or more memory units. The memory 192 may be arranged to be used to store e.g. information, and further to store data, configurations, schedulings, and applications, and for instance preference filters 6, categories of interest 61, genres 4, genres of interest 611, infotainment media playlists 4, media content 41, media content titles 411, vehicle status data 25, and/or status data criteria 26, to perform the methods herein when being executed in the infotainment providing system 1. Furthermore, the category determining unit 11, the position determining unit 12, the searching unit 13, the retrieving unit 14, the providing unit 15, the optional vehicle status determining unit 16, the optional adding unit 17, the optional presenting unit 18, the optional processor 191 and the optional memory 192 may for instance be implemented in one or several arbitrary nodes 19, arranged locally on-board the vehicle 2 or remotely therefrom such as in one or more databases which may support e.g. cloud functionality, and/or in the user device 21. The node 19 may be an electronic control unit (ECU) or any suitable generic electronic device, and may involve, for instance, an infotainment node or a main central node. The disposition of the functionality between e.g. the node(s) 19 and e.g. the user device 21 may be arbitrary selected as considered suitable. According to an alternative example, the nodes 19 may, rather than being represented by e.g. one or several integrated ECUs, be represented by a plug-in solution, for instance a dongle. In that manner, an aftermarket solution may be provided to any arbitrary vehicle suitable.

Those skilled in the art will also appreciate that the category determining unit 11, the position determining unit 12, the searching unit 13, the retrieving unit 14, the providing unit 15, the optional vehicle status determining unit 16, the optional adding unit 17, and/or the optional presenting unit 18, may refer to a combination of analog and digital circuits, and/or one or more processors configured with software and/or firmware, e.g. stored in a memory such as the memory 192, that when executed by the one or more processors such as the processor 191 perform as will be described in more detail below. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 6:
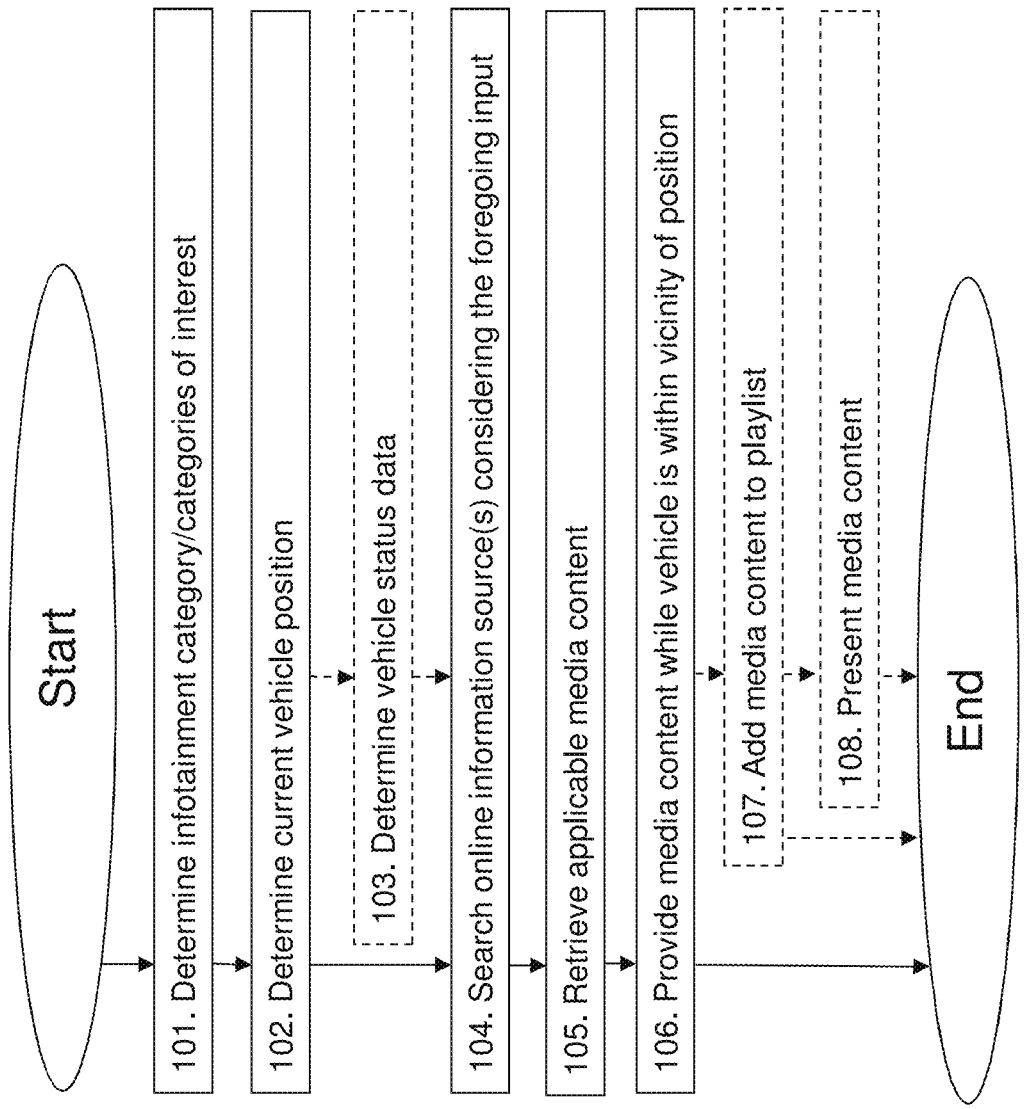
FIG. 6 is a flowchart depicting an exemplifying method performed by an infotainment providing system according to embodiments of the disclosure.

FIG. 6 is a flowchart depicting an exemplifying method performed by an infotainment providing system 1 according to embodiments of the disclosure. The method in the infotainment providing system 1 is for providing personalized position-based infotainment in the vehicle 2. The exemplifying method, which may be continuously repeated, comprises the following actions discussed with support from FIGS. 1-5. The actions may be taken in any suitable order, and/or one or more actions may even be performed simultaneously where applicable.

Action 101

In Action 101, the infotainment providing system 1 determines, e.g. by means of the category determining unit 11, the at least first infotainment category of interest 61.

Correspondingly, the category determining unit 11 is adapted for determining at least a first infotainment category of interest 61.

Action 102

In Action 102, the infotainment providing system 1 determines, e.g. by means of the position determining unit 12, the current position 22 of the vehicle.

Correspondingly, the position determining unit 12 is adapted for determining the current position 22 of the vehicle.

Action 103

In optional Action 103, the infotainment providing system 1 may determine, e.g. by means of the vehicle status determining unit 16, vehicle status data 25 comprising one or more status data parameters 251 reflecting current vehicle status.

Correspondingly, the vehicle status determining unit 16 may be adapted for determining vehicle status data 25 comprising one or more status data parameters 251 reflecting current vehicle status.

Action 104

In Action 104, the infotainment providing system 1 searches, e.g. by means of the searching unit 13, the at least first online information source 5, based on the at least first infotainment category of interest 61 and taking into consideration the determined vehicle position 22.

Correspondingly, the searching unit 13 is adapted for searching at least the first online information source 5, based on the at least first infotainment category of interest 61 and taking into account the determined vehicle position 22.

Optionally, the Action 104 of searching the at least first online information source 5, may comprise searching at least a first publicly available online information source 51.

Additionally or alternatively, optionally, the Action 104 of searching the at least first online information source 5, may comprise searching the at least first non-public online information source 52, which at least first non-public online information source 52 comprises one or more databases to which the vehicle 2, the infotainment providing system 1, the user device 21 associated with the vehicle 2, and/or the vehicle occupant 23, is allowed at least partial access.

Correspondingly, the searching unit 14 may be adapted for searching the at least first publicly available online information source 51. Additionally or alternatively, optionally, the searching unit 14 may be adapted for searching the at least first non-public online information source 52, which at least first non-public online information source 52 comprises one or more databases to which the vehicle 2, the infotainment providing system 1, the user device 21 associated with the vehicle 2, and/or the vehicle occupant 23, is allowed at least partial access.

Action 105

In Action 105, the infotainment providing system 1 retrieves, e.g. by means of the retrieving unit 14, at least a first piece of media content 41 which falls under the at least first infotainment category of interest 61 and which is associated with the determined vehicle position 22.

Correspondingly, the retrieving unit 14 may be adapted for retrieving at least a first piece of media content 41 which falls under the at least first infotainment category of interest 61 and which is associated with the determined vehicle position 22.

Should the Action 104 of searching the at least first online information source 5 follow upon optional Action 103 of determining vehicle status 25, then Action 104 or searching the at least first online information source 5, based on the first infotainment category of interest 61 and taking into consideration the determined vehicle position 22, additionally takes into consideration the at least first vehicle status data parameter 251. Moreover, then Action 105 of retrieving at least a first piece of media content 41 comprises retrieving at least a first piece of media content 41 which falls under the at least first infotainment category of interest 61 and which is associated with the determined vehicle position, and which then additionally is associated with the vehicle status data 25.

Correspondingly, should the infotainment providing system 1 comprise the optional vehicle status determining unit 16 which may be adapted for determining vehicle status data 25, then the searching unit 13 may be adapted for searching the at least first online information source 5, based on the first infotainment category of interest 61 and taking into consideration the determined vehicle position 22, and additionally take into consideration the at least first vehicle status data parameter 251. Moreover, the retrieving unit 14 may then be adapted for retrieving at least a first piece of media content 41 which falls under the at least first infotainment category of interest 61 and which is associated with the determined vehicle position 22, and which additionally is associated with the vehicle status data 25.

Optionally, the at least first piece of media content 41 may comprise an audio clip comprising one or a combination of music, news, advertisement, and/or information.

Action 106

In Action 106, the infotainment providing system 1 provides, e.g. by means of the providing unit 15, the at least first piece of media content 41 while the vehicle 2 is in the vicinity 3 of the determined vehicle position 22.

Correspondingly, the providing unit 15 is adapted for providing the at least first piece of media content 41 while the vehicle 2 is in the vicinity of the determined vehicle position 22.

Action 107

In optional Action 107, the infotainment providing system 1 may add, e.g. by means of the adding unit 17, the at least first piece of media content 41 to the infotainment media playlist 4 comprised in the infotainment providing system 1, which infotainment media playlist 4 is accessible by the vehicle occupant 23.

Correspondingly, the adding unit 17 may be adapted for adding the at least first piece of media content 41 to the infotainment media playlist 4 comprised in the infotainment providing system 1, which infotainment media playlist 4 is accessible by the vehicle occupant 23.

Optionally, the Action 107 of adding the at least first piece of media content 41 to the infotainment media playlist 4, may comprise presenting the title 411 of the at least first piece of media content 41 of the infotainment media playlist 4, via the playlist presentation medium 27 associated with the vehicle 2 and/or associated with the user device 21 on-board the vehicle 2.

Correspondingly, the adding unit 17 may be adapted for presenting the title 411 of the at least first piece of media content 41 of the infotainment media playlist 4, via the playlist presentation medium 27 associated with the vehicle 2 and/or associated with the user device 21 on-board the vehicle.

Action 108

In optional Action 108, the infotainment providing system 1 may present, e.g. by means of the presenting unit 18, at least a portion of content of the at least first piece of media content 41, via the media content presentation medium 24 associated with the vehicle 2 and/or associated with the user device 21 on-board the vehicle 2.

Correspondingly, the presenting unit 18 may be adapted for presenting at least a portion of content of the at least first piece of media content 41, via the media content presentation medium 24 associated with the vehicle 2 and/or associated with the user device 21 on-board the vehicle 2.

Thus, according to an example, and as shown on the left hand side in FIG. 3, the region in which the determined vehicle position 22 is located or is close to, here namely "Long Branch", is, during the search of Action 104, for instance by searching a publicly available online information source 51 such as commonly known "Wikipedia", found to match the city of birth 5111 of artist Bruce Springsteen. Furthermore, the selected at least first genre of interest 611, here namely "Rock", is, during the search of Action 104, found to match a music genre 5112 of the artist Bruce Springsteen. Subsequently, in a similar manner, in yet a further search of Action 104, for instance by searching a publicly available online information source 51 such as commonly known "Spotify" using the derived search term "Bruce Springsteen", as of Action 105 at least a first piece of media content 41 may be retrieved, for instance "Born in the USA", which falls under the at least first infotainment category of interest 61—"Music"/"Rock"—and which is associated with the determined vehicle position 22—"Long Branch"—since the artist Bruce Springsteen was born there.

The exemplifying media content 41 "Born in the USA" is then, as of Action 106 provided, e.g. available, while the vehicle 2 is considered to be in the vicinity 3 of the determined vehicle position 22, e.g. when the vehicle 2 is in, or nearby, "Long Branch". Accordingly, when the vehicle 2 is no longer considered to be in the vicinity 3 of the determined vehicle position 22, the media content 41 "Born in the USA" is no longer provided, e.g. no longer available, in the infotainment providing system 1.

Furthermore, as shown on the right hand side of FIG. 2, the exemplifying media content 41 "Born in the USA" may, as of Action 107, be added to the infotainment media playlist 4, and the title 411 thereof, "Born in the USA by Bruce Springsteen", subsequently visualized on the display 27. Subsequently, at least a portion of content of the exemplifying media content 41 "Born in the USA" may, as of Action 108, be presented via the media content presentation medium 24, for instance via loudspeakers of the vehicle 22 and/or loudspeakers of the user device 21. Since the infotainment media playlist 4 is accessible by the vehicle occupant 23, he or she may have the ability to e.g. skip said exemplifying media content 41 "Born in the USA", for instance by deleting the title 411 thereof.

In a similar manner, according to another example, and as shown on the right hand side of FIG. 3, one of the selected categories of interest 61, namely "History", is, during the search of Action 104, for instance by searching a publicly available online information source 51 such as commonly known "Wikipedia", in content 512 associated with "Long Branch" and/or "New Jersey"—where the determined vehicle position 22 is located—found to match one of the labels, namely the first label 5121. Furthermore, another one of the selected categories of interest 61, namely "Politics", is found to match another one of the labels, namely the second label 5122. Subsequently, as of Action 105, at least a first piece of media content 41 may be retrieved which falls under the at least first infotainment category of interest 61—"History"—and which is associated with the determined vehicle position 22—"Long Branch". The at least first piece of media content 41 may according to this example be represented by content, for instance text, derived from under the first label 5121, which text for instance may be converted into an audio clip by applying commonly known text-to-speech functionality.

The exemplifying media content 41 "History of state of New Jersey" is then, as of Action 106 provided while the vehicle 2 is considered to be in the vicinity 3 of the determined vehicle position 22, e.g. when the vehicle 2 is in, or nearby, "Long Branch". Furthermore, as shown on the right hand side of FIG. 2, the exemplifying media content 41 "History of state of New Jersey" may, as of Action 107 be added to the infotainment media playlist 4, and the title 411 thereof subsequently visualized on the display 27. Subsequently, at least a portion of content of the exemplifying media content 41 "History of state of New Jersey" may, as of Action 108 be presented via the media content presentation medium 24.

In a similar manner, according to yet another example, and as shown on the left hand side of FIG. 4, as of optional Action 103 vehicle status data 25 may be determined, which vehicle status data 25 comprises one or more status data parameters 251 reflecting current vehicle status. According to this example, the one or more status data parameters 251 is represented by "Current number of vehicle occupants", which reflects that there currently is two vehicle occupants 23 in the vehicle 2. Furthermore, one of the selected categories of interest 61 is "Restaurant". Accordingly, during a search of Action 104, for instance by searching the at least first non-public online information source 52, based on the at least first category of interest 61, here "Restaurant", and taking into consideration the determined vehicle position 22, and additionally taking into consideration the at least first vehicle status data parameter 251, here "Current number of vehicle occupants" which equals the value "2", a match fulfilling the input criteria may be found.

That is, subsequently, as of Action 105 at least a first piece of media content 41 may be retrieved which falls under the at least first infotainment category of interest 61—"Restaurant"—and which is associated with the determined vehicle position 22, and further additionally is associated with the vehicle status data 25, i.e. the one or more status data parameters 251 here represented by "Current number of vehicle occupants". The at least first piece of media content 41 may according to this example be represented by for instance an audio clip of a commercial dinner offer at the restaurant 8 for instance named "Long B", which is determined, for instance by being geo-tagged, to be in the vicinity 3 of the determined vehicle position 22.

The exemplifying media content 41 representing the offer of eating for two and paying for one at the restaurant Long B is then, as of Action 106 provided while the vehicle 2 is considered to be in the vicinity 3 of the determined vehicle position 22. Furthermore, as shown on the right hand side of FIG. 2, said media content 41 may, as of Action 107 be added to the infotainment media playlist 4, and a title 411 thereof, such as for instance "Restaurant Long B—Eat 2, pay for 1", subsequently visualized on the display 27. Subsequently, at least a portion of content of said exemplifying media content 41, i.e. said dinner offer, may as of Action 108 be presented via the media content presentation medium 24.

Consequently, according to the introduced concept as described in the foregoing, since the infotainment providing system 1 operates essentially in real-time, there is no need to generate an infotainment media playlist 4 ahead of the journey. Furthermore, as a determined position 22 of the vehicle 2 is taken into consideration, the infotainment media content 41 may be related to an actual route of the vehicle 2, rather than an assumed, perhaps deceptive, route. Moreover, as preferences of a user, for instance a vehicle driver 23, additionally is taken into consideration, the infotainment media content 41 may be adapted to suit the e.g. driver 23, hence enabling him or her to, to greater extent, have a pleasant driving experience The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by an infotainment providing system for providing personalized position-based infotainment in a vehicle, the method comprising:
   determining, via a category determining unit, at least a first infotainment category of interest;
   determining, via a position determining unit, a position of the vehicle;
   determining, via a vehicle statue determining unit, vehicle status data comprising one or more status data parameters reflecting current vehicle status, wherein the one or more status data parameters comprises a driver alert status and/or a number of occupants of the vehicle;
   comprising each of the one or more status data parameters to an associate threshold value, wherein the associated threshold value is selectable and adjustable by a user;
   identifying at least one of the one or more status data parameters that satisfies a predetermined relationship to its associated threshold value;
   searching, via a searching unit, at least a first online information source, based on the at least first infotainment category of interest, the determined vehicle position, and the at least one of the one or more status data parameters identified;
   retrieving, via a retrieving unit, at least a first piece of media content which falls under the at least first infotainment category of interest and which is associated with the determined vehicle position and the vehicle status data; and
   providing, via a providing unit, the at least first piece of media content while the vehicle is in a vicinity of the determined vehicle position.

2. The method according to claim 1 further comprising:
   adding the at least first piece of media content to an infotainment media playlist comprised in the infotainment providing system, which infotainment media playlist is accessible by an occupant of the vehicle.

3. The method according to claim 1 further comprising:
   presenting at least a portion of content of the at least first piece of media content, via a media content presentation medium associated with the vehicle and/or associated with a user device on-board the vehicle.

4. The method according to claim 1 wherein searching the at least first online information source comprises:
   searching at least a first publicly available online information source; and/or
   searching at least a first non-public online information source, which at least first non-public online information source comprises one or more databases to which the vehicle, the infotainment providing system, a user device associated with the vehicle, and/or an occupant of the vehicle, is allowed at least partial access.

5. The method according to claim 1 wherein the at least first piece of media content comprises an audio clip comprising one or a combination of music, news, advertisement, and/or information.

6. The method according to claim 1 wherein the vicinity comprises a distance less than or equal to 10,000 meters.

7. The method according to claim 1 further comprising:
   comparing a number of the at least a first piece of media content retrieved to a threshold number;
   increasing a size of the vicinity of the determined vehicle position in response to the number of the at least a first piece of media content failing to exceed the threshold number; and
   decreasing the size of the vicinity of the determined vehicle position in response to the number of the at least a first piece of media content exceeding the threshold number.

8. An infotainment providing system adapted for providing personalized position-based infotainment in a vehicle, the infotainment providing system comprising:
   a category determining unit configured to determine at least a first infotainment category of interest;
   a position determining unit configured to determine a position of the vehicle;
   a vehicle status determining unit configured to determine vehicle status data comprising one or more status data parameters reflecting current vehicle status, wherein the one or more status data parameters comprises a driver alert status and/or a number of occupants of the vehicle;
   wherein the system is configured to (i) compare each of the one or more status data parameters to an associate threshold value, wherein the associated threshold value is selectable and adjustable by a user, and (ii) identify at least one of the one or more status data parameters that satisfies a predetermined relationship to its associated threshold value;
   a searching unit configured to search at least a first online information source, based on the at least first infotainment category of interest, the determined vehicle position, and the at least one of the one or more status data parameters identified;
   a retrieving unit configured to retrieve at least a first piece of media content which falls under the at least first infotainment category of interest and which is associated with the determined vehicle position and the vehicle status data; and
   a providing unit configured to provide the at least first piece of media content while the vehicle is in a vicinity of the determined vehicle position.

9. The infotainment providing system according to claim 8 further comprising:
   an adding unit configured to add the at least first piece of media content to an infotainment media playlist comprised in the infotainment providing system, which infotainment media playlist is accessible by an occupant of the vehicle.

10. The infotainment providing system according to claim 8 further comprising:
    a presenting unit configured to present at least a portion of content of the at least first piece of media content via a media content presentation medium associated with the vehicle and/or associated with a user device on-board the vehicle.

11. The infotainment providing system according to claim 8 wherein the searching unit is configured to:
  search at least a first publicly available online information source; and/or
  search at least a first non-public online information source, which at least first non-public online information source comprises one or more databases to which the vehicle, the infotainment providing system, a user device associated with the vehicle, and/or an occupant of the vehicle, is allowed at least partial access.

12. The infotainment providing system according to claim 8 wherein the at least first piece of media content comprises an audio clip comprising one or a combination of music, news, advertisement, and/or information.

13. A vehicle comprising an infotainment providing system according to claim 8.

14. A user device comprising an infotainment providing system according to claim 8.

15. The infotainment providing system according to claim 8 wherein the vicinity comprises a distance less than or equal to 10,000 meters.

16. The infotainment providing system according to claim 8 wherein the system is configured to:
  compare a number of the at least a first piece of media content retrieved to a threshold number;
  increase a size of the vicinity of the determined vehicle position in response to the number of the at least a first piece of media content failing to exceed the threshold number; and
  decrease the size of the vicinity of the determined vehicle position in response to the number of the at least a first piece of media content exceeding the threshold number.

17. A non-transitory computer readable medium comprising stored computer executable program code, the program code for execution by a computer or processor to:
  determine at least a first infotainment category of interest;
  determine a position of the vehicle;
  determine, vehicle status data comprising one or more status data parameters reflecting current vehicle status, wherein the one or more status data parameters comprises a driver alert status and/or a number of occupants of the vehicle;
  compare each of the one or more status data parameters to an associate threshold value, wherein the associated threshold value is selectable and adjustable by a user;
  identify at least one of the one or more status data parameters that satisfies a predetermined relationship to its associated threshold value;
  search at least a first online information source, based on the at least first infotainment category of interest, the determined vehicle position, and the at least one of the one or more status data parameters identified;
  retrieve at least a first piece of media content which falls under the at least first infotainment category of interest and which is associated with the determined vehicle position and the vehicle status data; and
  provide the at least first piece of media content while the vehicle is in a vicinity of the determined vehicle position.

18. The non-transitory computer readable medium according to claim 17 wherein the vicinity comprises a distance less than or equal to 10,000 meters.

19. The non-transitory computer readable medium according to claim 17 further comprising computer executable program code for execution by a computer or processor to:
  compare a number of the at least a first piece of media content retrieved to a threshold number;
  increase a size of the vicinity of the determined vehicle position in response to the number of the at least a first piece of media content failing to exceed the threshold number; and
  decrease the size of the vicinity of the determined vehicle position in response to the number of the at least a first piece of media content exceeding the threshold number.

* * * * *

UNITED STATES PATENT AND TRADEMARK OFFICE
CERTIFICATE OF CORRECTION

PATENT NO. : 10,509,839 B2
APPLICATION NO. : 14/859964
DATED : December 17, 2019
INVENTOR(S) : Staffan Davidsson et al.

Page 1 of 1

It is certified that error appears in the above-identified patent and that said Letters Patent is hereby corrected as shown below:

In the Claims

Column 25, Line 23, Claim 1:
After "determining, via a vehicle"
Delete "statue" and
Insert -- status --.

Signed and Sealed this
Thirty-first Day of March, 2020

Andrei Iancu
*Director of the United States Patent and Trademark Office*